Sept. 2, 1924.
K. DIENST
1,507,050
PROCESS FOR THE STORAGE OF GRAIN
Filed April 19, 1921
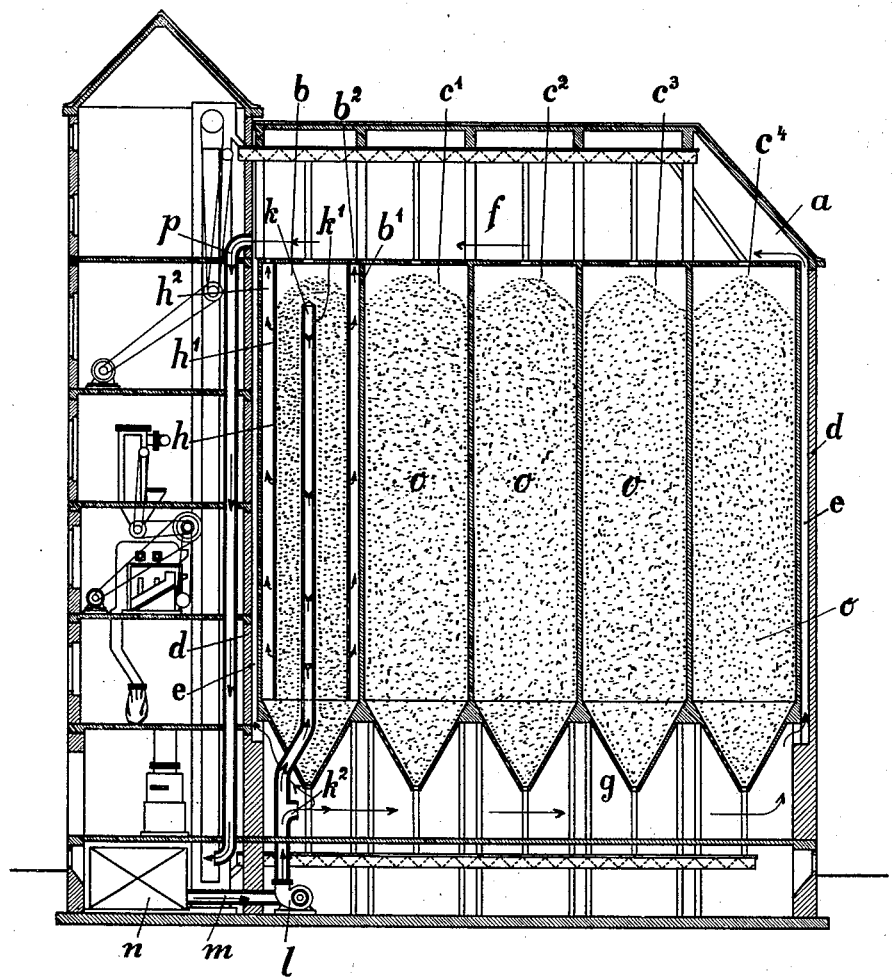
Inventor
Karl Dienst

Patented Sept. 2, 1924.

1,507,050

UNITED STATES PATENT OFFICE.

KARL DIENST, OF CHARLOTTENBURG, NEAR BERLIN, GERMANY.

PROCESS FOR THE STORAGE OF GRAIN.

Application filed April 19, 1921. Serial No. 462,780.

*To all whom it may concern:*

Be it known that I, KARL DIENST, a citizen of the Republic of Germany, of 23 Schillerstrasse, Charlottenburg, near Berlin, Germany, have invented certain new and useful Improvements in Processes for the Storage of Grain, for which an application for patent was filed in Germany, May 31, 1917, and of which the following is a specification.

As is well known, corn is subjected to loss in weight during continuous storage, which loss is one of moisture due to drying, one caused by respiration and another caused by grain-eating beetles.

For the purpose of continuous storage of grain, it was necessary up to the present to dry the latter, and it has been found out that its natural content of moisture had to be decreased to such an extent that it will be below that degree customary for grain capable of being milled. As is often done in order to render the grain capable of being ground, water is added preparatory to grinding, however such procedure will be followed by some drawbacks. For instance it is very difficult when moistening the grain, to maintain the exact quantity of water to be added, and besides it is more difficult to moisten the core of the flour particles uniformly, the more the grain has been dried out. The moisture mainly adheres to the bran and in consequence causes a more difficult grinding, consuming more power, and besides it rapidly damages the bran, especially if the latter is exposed to a warm outside temperature. On the other hand it has been ascertained that the moistening process might be wrongly used for if the grain is moistened in excess, the flour is consequently too moist.

For the production of bright and clear flour a greater content of moisture in the grain is required than that with which the grain may be permanently stored, since in the case of dry grain the husk of the individual grains will be torn up and consequently the marketing value of the grain be decreased. If it is desired to obtain bright flour from dry grain, a very fine screening is required, causing again a larger consumption of motive power. Besides, the product will suffer as regards its condition, since it will be partly ground in excess and produce a flour of bad baking quality. On the other hand heavy damage in consequence of the loss by weight is experienced if the flour or the product of grinding to be prepared for permanent storage is not subjected to subsequent moistening. Therefore, it appears desirable to keep the corn during permanent storage in such a condition, that it will yield the largest output of flour possible, and in a marketable state.

For this purpose the process of cool storage by means of refrigerating plants, such as are known to be used for other vegetables have been suggested, that is to say the grain is shut up in compartments, for instance silo-boxes, in which it is stored in a cool state and maintained in this state permanently at about $\pm 2°$ centigrade. The change of air constantly required for maintaining the cooling action is not effected in the presence of the grain stored, but the receptacles containing the grain are cooled from the outside which naturally involves the provision of a double wall surrounding the said receptacle. In this way drying of the grain will not take place during cool storage, and furthermore respiration will not be in existence permanently, since no change of air takes place in the presence of the cooled grain, and finally organic life is impossible in the cooled grain.

In the drawing a device for carrying out the process is illustrated in vertical section.

In a suitable building $a$ several compartments $b$ $c^1$ $c^2$ $c^3$ $c^4$ are arranged, in which the compartment or cell $b$ serves for the cooling of the grain, which latter is conveyed to the storage compartments or cells $c^1$ $c^2$ $c^3$ $c^4$ after cooling. The walls $d$ surrounding all these cells are provided with hollow spaces $e$, while spaces $f$ $g$ are provided above and below said cells communicating with spaces $e$. The compartment $b$ possesses a casing $h$ provided with perforations $h'$, which casing is distanced from the wall $b'$ of the compartment, and is in communication with the space $f$ on the top of said compartment by means of openings $b^2$. In the centre of the compartment $b$ a pipe $k$ having perforations $k'$ is provided, which is led through the bottom of the compartment and coupled to the pressure side of a fan $l$. Besides, the pipe $k$ is provided with a lateral opening $k^2$ leading into the chamber $g$. The suction side of the fan $l$ is connected by means of a pipe $m$ to an air cooling device of any suitable construction.

The grain $o$ is in the first place fed into the first compartment $b$, the so-called cooling cell, where it is exposed to a current of cool air, which flows through the compartment in the direction of the arrows, as shown, under pressure. The air penetrates the perforations $h'$ of the casing $h$ and flows into the space $h^2$ and from thence through holes $b^2$ into the compartment $f$. From this latter the air is withdrawn through a pipe $p$. Through the lateral opening $k^2$ in the pipe $k$ the cool air enters the space $g$ and flows through the spaces $e$ in the walls surrounding the compartments, reaches the space $f$ on the top of said compartments and ultimately will leave said space through the pipe $p$. By means of the described device the grain is in the first place cooled in the cooling compartment $b$ and then stored in the compartments $c^1$ $c^2$ $c^3$ $c^4$ . . ., which latter are permanently cooled from outside.

I claim:

1. The method of storing grain, which comprises circulating cold air through the grain and then storing the grain while cold without access to the outer air and without circulation through the grain, maintaining the low temperature of the grain during its storage without access to the cooling medium.

2. The method of storing grain, which comprises cooling the grain while preventing the condensation of atmospheric moisture thereon during cooling, then storing the cooled grain without access of air and maintaining its cold temperature during its storage.

3. The method of storing grain, which comprises cooling the grain by circulating therethrough a current of cold air thereby preventing the condensation thereon of atmospheric moisture, then storing the grain without access of air and without circulation therethrough in closed bins, and circulating about said bins cold air to maintain the temperature first imparted to the grain.

4. The method of storing grain, which comprises cooling the grain to about 0° C., by circulating therethrough a current of cold air, thereby preventing the condensation thereon of atmospheric moisture, then storing the grain without access of air and without circulation therethrough in closed bins, and circulating about said bins cold air to maintain the temperature first imparted to the grain.

In testimony that I claim the foregoing as my invention I have signed my name to this specification.

KARL DIENST.